March 4, 1958  K. A. KNUTSEN  2,825,502
ELECTRONIC CALCULATORS
Filed July 1, 1950  3 Sheets-Sheet 1

INVENTOR
KNUT ANDREAS KNUTSEN
BY:
Haseltine, Lake & Co.
AGENTS

March 4, 1958  K. A. KNUTSEN  2,825,502
ELECTRONIC CALCULATORS
Filed July 1, 1950  3 Sheets-Sheet 2

INVENTOR
KNUT ANDREAS KNUTSEN
By:
Hazeltine, Lake & Co.
AGENTS

March 4, 1958  K. A. KNUTSEN  2,825,502
ELECTRONIC CALCULATORS
Filed July 1, 1950  3 Sheets-Sheet 3

INVENTOR
KNUT ANDREAS KNUTSEN
BY
Haseltine, Lake & Co.
AGENTS

United States Patent Office 2,825,502
Patented Mar. 4, 1958

2,825,502

ELECTRONIC CALCULATORS

Knut Andreas Knutsen, Paris, France, assignor to Compagnie des Machines Bull (Societe Anonyme), Paris, France, a company of France Application July 1, 1950, Serial No. 171,684

Claims priority, application France July 7, 1949

4 Claims. (Cl. 235—61)

This invention relates to improvements in electronic totalisation arrangements, and especially to those based on the binary system of notation.

It is known that any registering arrangement in which binary notation is employed must comprise a number of binary denominations equal to the exponent plus 1 of the power of 2 which represent the largest number to be registered.

Thus, if it is desired to register in a single arrangement the largest number of 10 decimal figures which is an exact power of 2, say $2^{33}$, the registering arrangement should be provided with 34 denominations. It is also known that, despite the larger number of denominations necessitated by the binary system as compared with the decimal system, the first system is more advantageous in carrying out calculations owing to its more rapid operation and the simplification of the calculating devices. The same is the case when electronic calculating devices are used.

Any adding operation necessitates, regardless of the system, the successive introduction of the terms into an accumulator, and the determination and the transfer of the values to be carried over in order to obtain the final sum.

These various phases of the adding operation are generally accompanied in electronic arrangements by sending electric impulses to points at the required times by adequate distribution means.

It is known, in order to introduce a term into an electronic accumulator of the so-called trigger type, to send a train of impulses equal in number to that which it is desired to record. As the accumulator has only one input terminal for the train of impulses, it is rather a question of an impulse counter. Naturally, this method, which may be called a "series" method, is lengthy when the numbers to be dealt with are rather large.

Since, in a binary registering arrangement, each denomination or order can only have two states, namely a recording phase or state "1" and a non-registering state "0," the recording of a number amounts to setting into state "1" the denominations representative of this number and in leaving the others in state "0."

A method, which may be called the "parallel" method, is known which consists in introducing a numerical value into a binary accumulator by simultaneously bringing the required elemental registering units to the stage "1" by the selective sending of an impulse to all these units. It is obvious that the latter method is by far the more rapid, since the time required for the introduction is independent of the numerical value of the term to be registered.

One object of the invention is to provide an electronic accumulator comprising means for the simultaneous introduction of each term by the so-called "parallel" method.

Another object of the invention is to provide adding means by which the term or terms to be added can be retained in one or more auxiliary electronic registering arrangements. The retention of the terms to be added is frequently necessary for all requirements of accounting, but more especially for effecting scientific calculations, which are sometimes fairly long, in which certain terms occur several times in the same formula.

Finally, a further object of the invention is to provide a means of effecting the carrying over necessitated by the addition of two ones in the same elemental registering units, this means being particularly simple and rapid and involving no complicated adjustment.

In the following description, which is given simply by way of non-limitative example, reference will be made to the accompanying diagrammatic drawings, which show the devices employed in accordance with the invention and in which.

Figure 4:
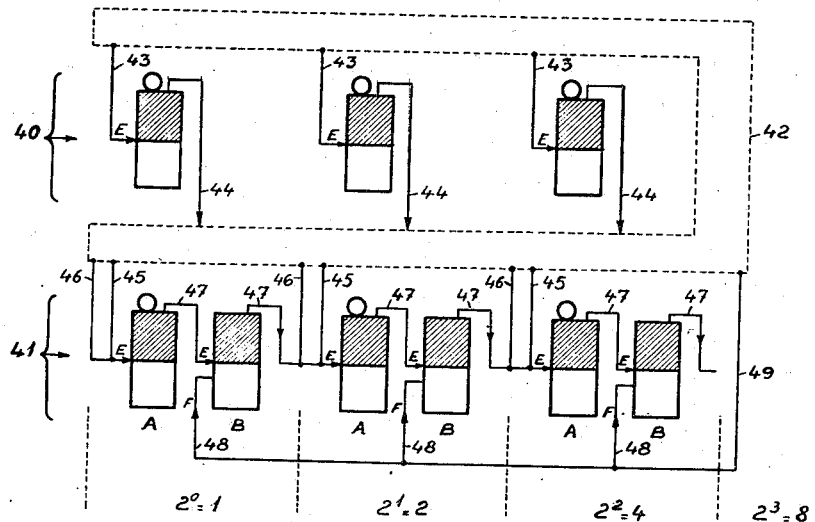
Figure 4A:
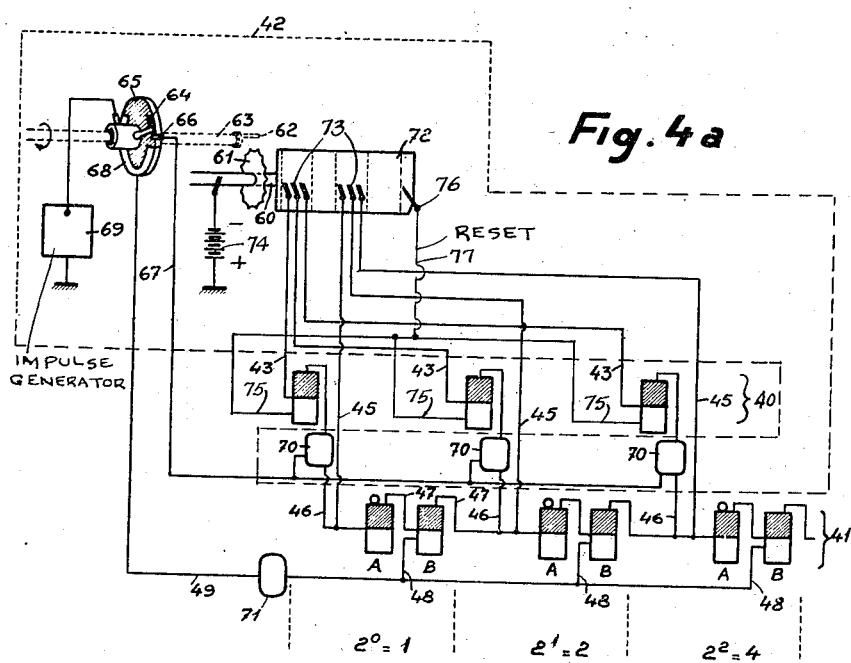
Figure 5:
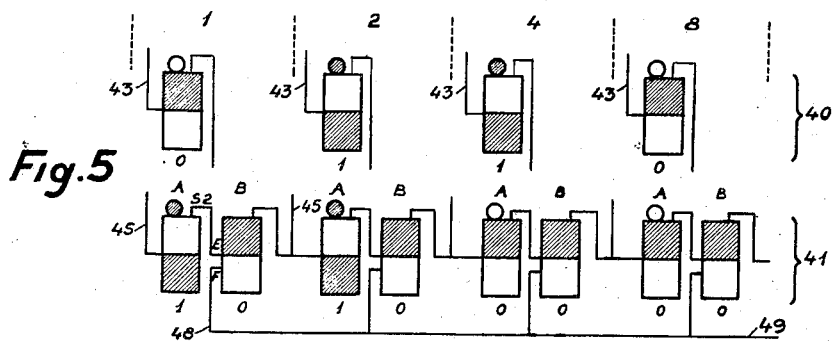
Figure 6:
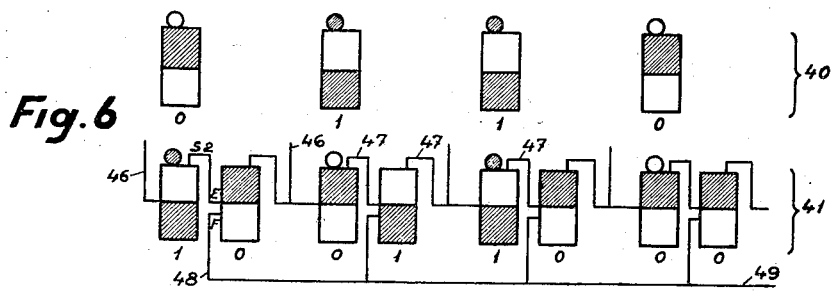
Figure 7:
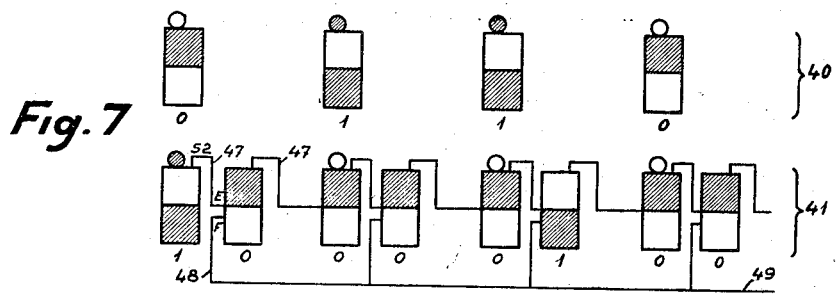
Figure 8:
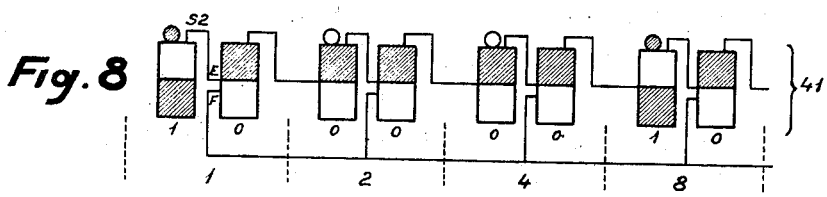
Figure 9:
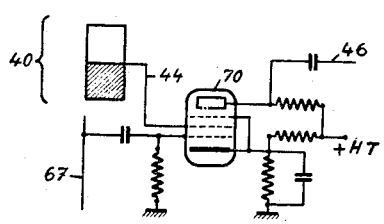

Figure 4 shows a circuit diagram illustrating the principle of the combination of the triggers according to the invention, Figure 4a shows diagrammatically one example of embodiment of the invention, Figure 5 shows the condition of the storage arrangement and of the accumulator after the introduction of the values corresponding to a concrete example, Figure 6 shows the condition of the accumulator after the transfer of the value from the storage arrangement into the accumulator, Figure 7 shows the condition of the accumulator after the reception of the first carry-over impulse, Figure 8 shows the condition of the accumulator after the reception of the second carry-over impulse which, in the example selected, gives the final result of the addition, and Figure 9 shows a detailed diagram of an element controlling the transfer of the data from the storage arrangement into the accumulator, as diagrammatically shown in Figure 4a.

The present invention is based on a particular combination of electronic trigger circuits which may be of any desired construction. A number of different types of these trigger circuits are known, which are also called "flip-flop" circuits.

It will be recalled that a trigger circuit has generally the feature of being able to exhibit successively two stable states and that the change from one to the other of these stable states is obtained by sending an impulse of desired polarity to the input end of the trigger. In the application envisaged, only the negative impulses have any controlling action on the states of the triggers employed.

Figure 1:
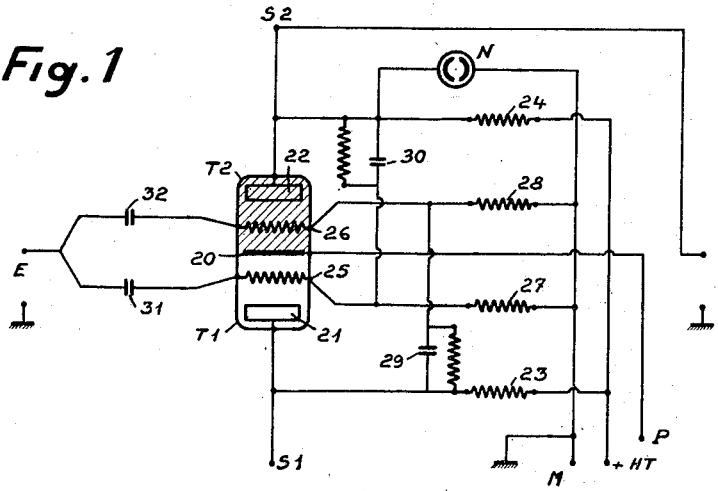
Figure 1 shows a simplified circuit diagram of a trigger of known type.

Figure 1 shows a simplified circuit diagram indicating one trigger stage solely to enable the following to be fully understood.

In this diagram, in which the trigger is constituted by a double triode T1 and T2, the stabilising means for maintaining a stage are not shown, since these means can vary according to the type of trigger. It will therefore be assumed that the problem is solved by means lying within the known art, so that the diagram may be simplified.

The essential constitution and the operation of the trigger of the type shown in Figure 1 will be briefly outlined.

The triode valves T1 and T2 may be assembled in a single bulb, and may have a common cathode 20 connected to the point P at a potential intermediate between that of the earth and that of the positive HT terminal. A source of direct current is connected between earth and the positive HT terminal. The plates 21 and 22 are connected to the positive HT terminal by the resistances 23 and 24. The grids 25 and 26 connected to the input terminal E by the condensers 31 and 32 are connected to earth by the resistances 27 and 28.

The grid 25 of T1 is connected by the condenser 30 to the plate 22 of T2, while the grid 26 of T2 is connected by the condenser 29 to the plate 21 of T1.

If it is desired to indicate the stable state of a trigger, it is possible to employ for this purpose a neon tube N. This will be connected between one of the plates and earth, for example. In Figure 1, the neon tube N is connected to the plate 22 of T2. In one state "1" the voltage of the plate 22 is sufficiently high for the tube N to light up, and in the other state the voltage of the plate 22, being much lower, is insufficient to ignite the tube N. Such an indicating system is not, however, essential.

When applying the feed voltages, a slight disturbance may produce a difference in the plate currents between the triodes T1 and T2. Owing to the crossed connections, this difference tends to increase until it reaches a stable state in which one of the triodes is non-conductive while the other is conductive. The grid of the first triode is then at a highly negative potential with respect to the cathode. Thus practically the plate current of the said triode is cut off. Conversely, the grid of the other triode remians at a potential substantially equal to that of the cathode, which results in a fairly high plate current of this triode.

It will be assumed, with reference to Figure 1, that the triode T2, for example, is conductive at a given instant, owing to substantially zero bias of the grid 26. The voltage drop across the resistance 24 due to the plate current of T2 brings the potential of the plate 22 with respect to earth to a value insufficient to ignite the neon tube N.

At the same instant, owing to the considerable negative bias of the grid 25 of T1 with respect to the cathode, the plate current of T1 is practically zero and the potential of the plate 21 is such higher than that of the plate 22.

Figure 1A:
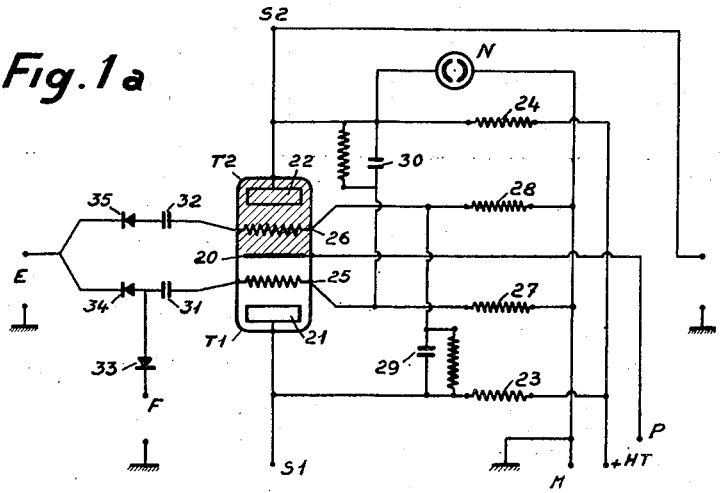
Figure 1a shows a simplified circuit diagram of a trigger according to the invention.

In Figure 1a, the triode T2 has been hatched to indicate that it is conductive, and the tube N is not hatched to indicate that it is not ignited, in the state considered, which will be called state "0" by convention.

If now a sufficiently negative impulse occurs at the terminals E and is transmitted by the condensers 31, 32 simultaneously to the two grids 25 and 26, the trigger passes to the other stable state by the following process. The negative impulse has no immediate action on T1 since the grid 25 is already strongly negative. On the other hand, it renders the grid 26 momentarily negative, and the plate current of triode T2 is suddenly stopped, which brings about a rapid increase in the potential of the plate 22. The amplified positive impulse resulting therefrom is transmitted by the condenser 30 to the grid 25 of T1 and is sufficient to make T1 become conductive and remain so. This state is the inverse of that previously described and will be called by convention state "1." This state will be maintained until the arrival of a negative impulse, which will produce phenomena which are the reverse of those described.

Figure 1a represents the trigger of the type shown in Figure 1, with modified inputs. In this figure, there is in addition to the input terminal E, called the symmetrical input terminal, which acts through condensers 31 and 32 on the two grids at the same time, an input terminal F called the asymmetrical input terminal which acts through 31 only on the grid 25 of T1. In order that an impulse fed to the terminal F may not directly influence the grid 26 of T2, the members 33, 34, 35 have been added, which are one-way conductive elements which can also serve as rectifiers and detectors.

There are different types of such elements, but here the germanium crystal diodes are particularly indicated by reason of the simplicity with which they can be set in operation, their low inter-electrode capacitance and their small dimensions.

The direction in which 33 and 34 are connected clearly shows, in Figure 1a, that a negative impulse arriving at the terminals F is transmitted by 33, but stopped by 34. The element 35 does not take part in the blocking, but it is as well to maintain it in order to ensure symmetry of the symmetrical input circuit.

Figures 2, 3:
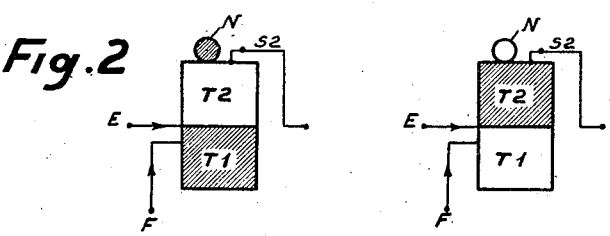
Figure 2 shows diagrammatically a trigger according to Figure 1a in the conventional state "1,"
Figure 3 shows diagrammatically the same trigger in the conventional state "0,"

Figures 2 and 3 show very diagrammatically the trigger circuit of Figure 1a in state "1" in Figure 2, and in state "0" in Figure 3. The essential elements of the trigger are shown therein, T1 and T2 being the two triodes, N the neon tube, E the impulse input terminal, called the symmetrical input terminal, S2 the output terminal connected to the plate T2, and F the asymmetrical input terminal.

In conformity with the accumulator proposed in accordance with the invention, Figure 4 shows a particular arrangement of the trigger circuits, the diagrammatic representation thereof being the same as in Figures 2 and 3.

The different binary denominations or orders have been limited to $2^0$, $2^1$, $2^2$, but all the parts may be supplemented to an extent which is limited only by the size of the numbers to be dealt with.

An auxiliary registering arrangement 40, Figure 4, serves as a storage arrangement for one of the terms to be added. When a second term has been introduced into the accumulator 41, the latter serves as an accumulator when the value of the first term is transferred thereto. 42 designates generally a switching and distributing system arranged to establish the connections and to send suitable impulses at given instants of an adding cycle. Electromechanical members may be suitable, but greater rapidity will obviously be possible with electronic circuits.

An impulse switching and distributing system, built of known elements, is shown in Figure 4a with the reference 42 as an example of a particular embodiment adapted to the present invention and is indicated in Figure 4 by the dashed lines with same reference 42.

It is to be noted that other registering arrangements could be provided, such as 40, to retain more than one term. The connection thereof to the switching system 42 would not afford any particular difficulty.

The registering or storage arrangement 40, Figure 4, is constituted by identical electronic triggers substantially indicated in Figures 1a, 2 and 3, in the proportion of one to each binary order. The connections 43, Figure 4, connect the switching system 42 to the input terminals E of each of the triggers of the storage arrangement 40 for the introduction of the value of the first term into the said storage arrangement. The connections 44 connect the output terminals of these same triggers to the switching arrangement for a subsequent control operation, that is to say, at the instant of the transfer of the value from 40 to 41. These triggers can be reset to zero in a known manner described, for example, in the United States Patents 2,445,215 (Fig. 1) and 1,978,931 (Fig. 1): the first of these patents describes the action of a switch S-1 applying a negative potential on grids of trigger tubes 1, 11 and 21 through resistors 17, 18 and 19 to reset these tubes in "0" condition; the second of these patents describes how in an accounting machine a punched hole in a special column in a record card (column 16) can change the functions of a record card controlled machine; the aggregation of these two points of these patents shows that a perforation in a special column of a determined record card can allow the switching and distributing system to direct a reset negative impulse to the grids of the trigger tubes of trigger group 40 (Figure 4a) which are conducting when said triggers are in "1" condition, said impulse returning these triggers into "0" condition.

The registering arrangement 41 or accumulator comprises, for each order, a trigger A and a trigger B.

These triggers are each the same as that shown in Figure 1a except that the trigger B has no indicating device N.

The connections 45, Figure 4, connect the switching arrangement 42 to the symmetrical input terminals E of the triggers A of 41 for the introduction of the value of the second term into the accumulator. The connections 46 connect the switching arrangement 42 to the symmetrical input terminals E of the triggers A of 41 for the transfer of the values from 40 into 41 during the adding operation.

The series of triggers A and B disposed side by side forms a linear chain, the connections of which are made by the connecting means 47 which connect the output terminal S2, Figure 1a, of one trigger to the symmetrical input terminal E of the following trigger, not only between the triggers A and B of one order, but between the trigger B of one order and the trigger A of the following order.

The connections 48, Figure 4, connect the asymmetrical input terminals F of all the triggers B to the switching arrangement 42 by a common connection 49 for the transmission of the carry-over impulses.

Figure 4a shows diagrammatically an example of an embodiment of the invention in combination with a record card reading device on an accounting or statistical machine.

In this figure, the elements identical to those of Figure 4 bear the same reference numerals. The record card 72 has each or a number of its lines punched according to the binary code.

It will be noted that the terms to be added are punched on the card 72 in two adjacent zones of columns, and that the card may be horizontally divided into 12 lines, for example, each of which can receive a term or a pair of terms. During the reading, the card must therefore be fed forward by one line interval and it must be stopped so that the reading brushes 73 are situated between two lines of perforations. The step-by-step advance of the card is effected by the conducting feed roller 60 which is connected to a notched wheel 61 actuated intermittently by the eccentric dog 62 turning on the end of the shaft 63. The number of notches in the wheel 61 is equal to the number of horizontal lines of the card plus a number of notches corresponding to the interval between two consecutive cards. The shaft 63 also drives the brush 64 of a commutator 65 which carries a segment 66, from which extends a connection 67, and a segment 68 connected to the connection 49. The brush 64 is connected to the output terminal of a positive impulse generator 69 which constantly supplies impulses of the required voltage. The relative keying of the brush 64 and of the dog 62 is such that, when the shaft 63 turns in the direction of the arrow, the advance of the card by one step, producing through the perforations in the card an impulse sent by connections 43 and 45 to the triggers of 40 and 41, is followed by the passage of the brush 64 over the segment 66 which is so dimensioned that the closing of the circuit 67—66—64—69 lasts just long enough for the passage of a single impulse. This impulse is transmitted by 67 to the control grids of the pentodes 70. Each of the latter can be used in accordance with the diagram of Figure 9. The cathode is connected to a two-resistance bridge which imparts thereto such a positive potential that in the inoperative condition the grid bias is sufficient to cancel out the plate current. The plate is connected to the positive HT by a load resistance. The screen grid is connected by the connection 44 to a trigger associated with the storage arrangement 40, at a point of the resistance network at which it is easy to find a substantially higher potential when the trigger is in stage "1" than is found when the latter is in stage "0." Such an arrangement is known and it is not necessary to give further details. It is sufficient to recall that if a positive impulse is applied to the control grid, a negative impulse can be received on the plate only if the screen grid is at this instant at sufficiently high potential.

Consequently each pentode 70 operates as a gate between each trigger of trigger group 40 and triggers A of trigger group 41. When a trigger of group 40 is in state "1" each output terminal 44 is at a higher positive potential than when the same trigger is in state "0" (it is that state "0" which is conventionally illustrated in Figure 4a) and as said hereinabove each output terminal 44 is connected to the screen grid of a pentode 70. A positive impulse furnished by impulse generator 69 through brush 64, segment 66 and connection 67 can be applied to the control grid of each pentode 70: the output terminal 46 of each pentode, which has its screen grid connected to an output terminal 44 of a trigger of group 40 in state "1" condition transmits a negative impulse to the input of the related trigger A and so changes the condition of this trigger from state "0" to state "1," or vice-versa.

Such a positive impulse applied through connection 67 effects the binary addition of the value of the binary number stored in group 40 and of the value of the binary number registered in group 41.

As soon as this operation is effected, brush 64 reaches segment 68, which is of such dimensions as to allow the transmission by impulse generator 69 of a determined number of positive impulses, through connection 49, to the input terminal of vacuum tube 71. This tube is so biased as to transmit the same determined number of negative impulses to the asymmetrical inputs of triggers B of trigger group 41 through connections 48. The action of these negative impulses will be described hereinafter.

Pentodes 70 operating as gates do not change the state or condition of the triggers of trigger group 40. If it is wanted that this group should be reset to zero, it can be done by any known means: by cutting off the HT on the tubes or as indicated hereinbefore, for example.

Despite the fact that Figures 2 to 8 do not show any connections between the triggers and earth, it is obvious that such connections are actually provided in order to ensure normal closing of the circuits.

The operation of the electronic accumulator, which forms the principal subject of the invention, will be more readily understood with reference to a concrete example detailing the adding operation, and with reference to Figures 1 to 4 for the connections. It will be assumed that the addition 6+3=9 is to be effected, which on the binary notation system is represented by denominations or orders.

```
     8 4 2 1

0 1 1 0
  +
     0 0 1 1
     -------
     1 0 0 1
```

The phases of the operation will succeed one another as follows:

(1) (a) Introduction of the term 6 into the storage arrangement 40. The storage arrangement and the accumulator having previously been released, that is to say, returned to zero, the switching arrangement 42 sends through the connections 43 an impulse to the input terminals of the triggers of the orders 2 and 4.

(b) Introduction of the term 3 into the accumulator 41. The switching arrangement 42 sends an impulse through the connections 45 to the input terminal of the triggers A of the orders 1 and 2. After this operation, the conditions of the storage arrangement and of the accumulator may be represented by Figure 5.

(2) The transfer of binary digits $2^1=2$ and $2^2=4$ from storage arrangement 40 to accumulator 41 is effected as hereinbefore described under control of impulse generator 69 and distributing device 65 sending one positive impulse to the control grids of gates 70 through brush 64, segment 66 and connection 67. So the triggers A corresponding to binary orders $2^1$ and $2^2$ of accumulator 41 are conditioned in the inverse of the stage in which they were.

As a determined number of these triggers are in "1" condition, owing to the previous registering of a binary number in accumulator 41 as hereinbefore described, each of these triggers on their return to "0" condition sends a negative impulse to the symmetrical input of the related trigger B through connections 47.

Thus the trigger A corresponding to binary order $2^1$ is set into "0" condition and the related trigger B is set into "1" condition; on the other hand, the trigger A corresponding to binary order $2^2$ being set into "1" condition, the related trigger B is not affected and remains in its previous "0" condition. The state of the triggers A and B is at that time as illustrated in Figure 6.

It results from this transfer that there is a binary carry-over stored in trigger B of binary order $2^1$.

(3) The switching and distributing device 42 then, by means of impulse generator 69 and brush 64 and segment 68 of distributing device 65, sends a series of positive impulses to vacuum tube 71 through connection 49. In turn, vacuum tube 71 sends a series of negative impulses to the asymmetrical inputs 48 of each of the triggers B. Any negative impulse applied to the input of a trigger B which is in "1" condition returns this trigger into "0" condition and, in the present example, the series of negative impulses acts as follows: the first impulse of the series returns the trigger B of binary order $2^1$ to "0" condition, the output of this trigger sends then a negative impulse to the input of trigger A of binary order $2^2$ which is in "1" condition and so returns this trigger in "0" condition, in turn the output of this same trigger sends then a negative impulse to the symmetrical input of the trigger B in same order (Figure 7); this figure shows that said trigger has passed from state "0" to state "1." The second impulse of the series arriving at the inputs F of triggers B, only affects the trigger B of order $2^2$ which passes from state "1" to state "0." This results in a negative impulse at the output of said trigger, which impulse is transmitted to the trigger A of order $2^3$. The latter thus passes from state "0" to state "1." The final condition is represented by Fig. 8.

It will thus be seen that all the triggers B have been returned to "0." If other negative impulses then arrive at the said triggers B, they will have absolutely no effect.

A great advantage of the method therefore resides in the fact that only the minimum number of carry-over impulses is determined by the maximum capacity of the accumulator.

In fact, if the most unfavourable case is considered, in which the value 1 must be added to another value occupying all the orders as far as the order $N-1$ (N being the maximum number of orders or denominations of the accumulator), it is necessary to transfer $N-1$ carry-over values, that is to say, to send at least $N-1$ carry-over impulses. It will be sufficient to provide a train of impulses, the number of which at each distinct addition will be slightly greater than $N-1$.

Since the maximum number of carry-over impulses is not precise, the means for distributing this train of impulses need not be very exact and need no delicate adjustment.

The addition of any two numbers requires the repetition of the same processes as have hereinbefore been described. For an accumulator having the capacity referred to at the beginning, having regard to the fact that the impulses for the introduction of the terms are much less numerous than the carry-over impulses, it is clear that the duration of the totalling operation depends mainly upon the capacity of the accumulator, and that for a given capacity, this duration is independent of the magnitude of the numbers.

Since the frequency of the carry-over impulses may reach and even exceed 1 megacycle per second, it will be seen that the duration of the operation expressed in microseconds, may be of the same order of magnitude as the number of denominations or orders of the totalisator.

Taking the concrete example of the totalisator having the aforesaid capacity, namely 34 binary elemental registering units allowing of registering the number 17,192,669,183, and a base frequency of 1 mc./s., the time strictly necessary for 34 carry-over impulses is of the order of 34 microseconds, while the time necessary for the transfer from 40 into 41 (Figure 4) is 1 microsecond. Since there is no exact maximum number of impulses, a train of 100 impulses±10% may be selected, which brings the total duration of the operation to about 100 microseconds, and facilitates the distribution of the said impulse train.

I claim:

1. An interconnection circuit forming a carry over system between successive number registering trigger circuits, each registering trigger circuit being adapted to receive numerical impulses to be successively registered in said registering trigger circuit by the way of a plurality of distinct input connections and carry-over impulses to be transferred in same said registering trigger circuit by the way of such an interconnection circuit, each of said input connections corresponding to each digit representative of denominational orders of numbers, the characteristic means by which said interconnection circuit may be distinguished comprising: trigger symmetrical input connections to enter transfer impulses by the means of two control components in a carry-over storage bistable trigger circuit arranged to be operable to either one of "0" or "1" conditions, said transfer impulses being furnished by a preceding registering trigger when said registering trigger circuit is switched from the "1" condition to the "0" condition by a numerical impulse and said transfer impulses being of such a polarity as to operate said carry-over storage trigger circuit to said "1" condition; a trigger asymmetrical input connection to enter control impulses by the means of a determined one of said two control components, said control impulses being of such a polarity as to return said carry-over storage trigger to said "0" condition when said carry-over storage trigger is in said "1" condition, a carry-over storage trigger output connection adapted to transfer a carry-over impulse to a following registering trigger circuit when one of said control impulses return said carry-over storage trigger circuit to said "0" condition; and one bus connection connecting the asymmetrical input connections of said carry-over system with control impulse generating and switching means which applies to said bus connection control impulses in number at least equal to the number of said registering trigger circuits minus one after each registering in said registering trigger circuits of numerical impulses representing a number.

2. In a combination of number registering trigger circuits and carry-over transfer trigger circuits, each carry-over transfer trigger circuit being interconnected between two registering circuits: impulse selecting energized connections distributing, alternatively to distinct numerical and control impulse entering means, a number of numerical impulses representing each number to be registered and control impulses in number at least equal to the number of said carry-over transfer circuits, said numerical impulse entering means including at least one input connection for each of said registering circuits and said control impulse entering means including a bus connection connecting all carry-over transfer trigger circuits; connecting means symmetrical in respect to a pair of control components in each of said carry-over transfer trigger circuits, said symmetrical connecting means being each connected between a determined output of the preceding registering circuit and a pair of said control components; connecting means asymmetrical in respect to each pair of control components, said asymmetrical connecting means being each connected between said bus connection and a determined one of the pair of control elements; and a carry-over connection between each determined output of each carry-over transfer trigger circuit and the input connections of the following registering trigger circuit.

3. A combination of trigger circuits as set forth in claim 2 further characterized in that resetting means of each carry-over transfer trigger circuit include said determined control element and said asymmetrical connecting means, said resetting means being adapted to be operated by one of said control impulses at each transfer of a carry-over.

4. In an accumulating arrangement comprising a series of number registering trigger circuits, which circuits are denominationally ordered and can be triggered by successive numerical impulses selectively applied to inputs of said trigger circuits under control of generating and switching means, carry-over storage and transferring means comprising a plurality of bi-stable carry-over storage trigger circuits, one storage trigger circuit being associated with each number registering trigger circuit, excepted for that of the highest denomination, by a connection between an output of said registering trigger circuit and an input related to two control elements of said storage trigger circuit, so that, when any registering trigger circuit has received an even number of numerical impulses a negative output impulse triggers the associated storage trigger circuit from a "0" condition to a "1" condition, a plurality of connections, one connection between an output of the storage trigger circuit of one denomination and the input of the registering trigger circuit of the next higher denomination, multiple connections connected on one hand to said generating and switching means and on the other hand to separate inputs each related to a single control element of one of said storage trigger circuits, for applying, after said numerical impulses, a series of successive carry-over transfer impulses in parallel to the separate inputs of all of said storage trigger circuits, said series comprising at least a number of transfer impulses equal to the number of storage trigger circuits, and each transfer impulse being of a polarity adapted to said single control element so as to cause the resetting to "0" condition of any storage trigger circuit being at the "1" condition and the transmission of a negative impulse to the input of the registering trigger circuit of the next higher denomination.

References Cited in the file of this patent

UNITED STATES PATENTS

| | | |
|---|---|---|
| 2,404,047 | Flory et al. | July 16, 1946 |
| 2,409,689 | Morton et al. | Oct. 22, 1946 |
| 2,445,215 | Flory | July 13, 1948 |
| 2,536,955 | Palmer et al. | Jan. 2, 1951 |
| 2,585,630 | Crosman | Feb. 12, 1952 |
| 2,591,008 | Rench | Apr. 1, 1952 |

OTHER REFERENCES

"A Digital Computer for Scientific Applications," West and De Turk, Proc. IRE, December 1948, pp 1452–1460.